ADJUSTABLE POTENTIOMETERS FOR ANALOG COMPUTERS AND THE LIKE

Filed Aug. 6, 1962

Inventors:
Bertrand A. Dreyfus
Jacques E. Martin
By Kemon, Palmer, Stewart & Estabrook, Attorneys United States Patent Office 3,230,491
Patented Jan. 18, 1966

3,230,491

ADJUSTABLE POTENTIOMETERS FOR ANALOG COMPUTERS AND THE LIKE

Bertrand Alain Dreyfus, Sevres, and Jacques Edouard Martin, Bougival, France, assignors to Societe d'Electronique et d'Automatisme, Courbevoie, Seine, France
Filed Aug. 6, 1962, Ser. No. 215,490
Claims priority, application France, Sept. 8, 1961, 872,809, Patent 1,311,847
1 Claim. (Cl. 338—123)

The present invention concerns improvements in or relating to adjustable potentiometers for analog computers and the like and has for its object to provide a structure of potentiometers for such purposes of high resolution and flexibility of use though being of reduced cost in their production.

Precision potentiometers for analog computers and the like must satisfy a number of conditions: high precision and resolution, high resistance values, reduced inductance values and small volume. Presently, for meeting such conditions, with insulated wire wound potentiometers, the production can only be made at high cost and without preserving the products from the danger of rupture of the wound wire during the useful life of said potentiometers.

At this time, the production of continuous layer potentiometer tracks is well known and examples are: layers of graphite, metals, oxides and/or nitrides. The production cost of these tracks is quite low when no high resolution is requested and which may easily be made in the higher range of resistances adapted for their use as adjustable potentiometer tracks for analog computing purposes. However, the plain substitution of such layers for the wound wire layers of conventional potentiometers cannot be considered, because mainly of the accurate reproductibility required in such analog computing potentiometers. It is an object of this invention to provide potentiometer arrangements using resistive layer tracks, which overcome such drawbacks.

According to the invention, an adjustable potentiometer for analog computing purposes comprises the combination of at least two resistive layer tracks, a pair of electrically separate mechanically united sliders bearing on one of the said tracks and being shifted slightly relative to each other along said one track, input analogue voltage terminals on the said one of the said tracks, electrical leads from said sliders to input supply terminals on the other one of the said tracks and a slider bearing on said other track and connected to an output lead of the potentiometer.

Further, according to the invention, an adjustable potentiometer for analog computing purposes comprises the combination of two substantially identical resistive layer tracks, each of said tracks being supplied with the input analog voltage signal and each provided with an output slider, said two sliders being mechanically united and angularly slightly shifted with respect to one another from one of said tracks to the other one, and a third resistive layer track supplied from the outputs of the sliders of said two substantially identical resistive layer tracks, and an output slider bearing on said third track and connected to an output lead of the potentiometer. Such an arrangement is specially suitable for small diameter tracks whereon it would be difficult to apply a pair of angularly shifted sliders and further it is of advantage in that it reduces the effect of irregularities of distribution of the resistance in each resistive layer track to various radii thereof. The two first tracks may be fed either in series or in parallel relation with the input analog voltage.

These and further features of the invention will be fully explained with reference to the accompanying drawings, wherein.

Figure 1:
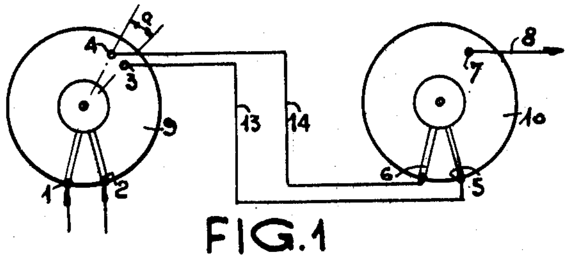
FIGURE 1 is a diagrammatic view of one embodiment of the present invention.

Referring to FIG. 1, the potentiometer comprises resistive layer track 9 and resistive layer track 10. Two brushes or sliders bear against track 9, as shown at 3 and 4. Electrical leads 13 and 14 connect said brushes to the input terminals 5 and 6 of track 10. The brushes 3 and 4 are angularly shifted with respect to one another by an angle *a* which may be of the order of one or two percent of the total angular span of the track 9 across its input terminals 1 and 2. The input analog voltage signal is applied across said terminals 1 and 2. A brush or slider 7 bears on the track 10 and is connected to an output lead 8.

A rough adjustment of the mechanically united brushes 3 and 4 gives across the leads 13 and 14 a signal approximating the requested output signal. Said approximate signal is applied across the terminals 5 and 6 of the track 10, the brush 7 of which is then adjusted for the fine adjustment of the finally obtained output analog signal at 8. The final track and brush 10–7 actually serves as a vernier for the adjustment of the complete potentiometer arrangement. Such a potentiometer thus gives a very high resolution and definition whilst comprising only tracks of quite ordinary qualities in this respect.

The resistance of track 9 is very high, and the resistance of track 10 is relatively low with respect to 9. Said tracks may be made as layers of a single base insulating disc, on opposite faces thereof, or they may be each made on separate base discs.

Figure 2:
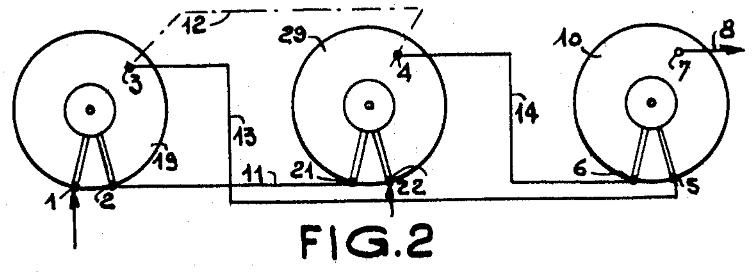
FIGURE 2 is a diagrammatic view of an alternative embodiment.
Figure 3:
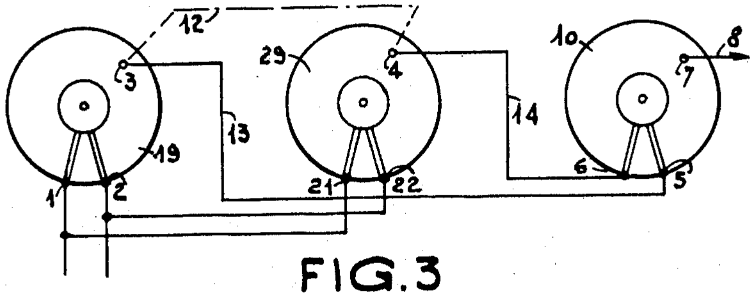
FIGURE 3 is a view similar to FIGURE 2 but showing a different electrical connection between the potentiometer sections.

The track 9 may be advantageously replaced by two separate tracks of identical resistance values. In FIGS. 2 and 3, these substitute tracks are numbered 19 and 29. Track 19 carries terminals 1 and 2 and is provided with the brush 3, which is connected by lead 13 to the input terminal 5 of track 10. Track 29 carries terminals 21 and 22 and is provided with a brush 4 connected by lead 14 to the input terminal 6 of the track 10. The brushes 3 and 4 are mechanically united as indicated by the dot-dash line 12 for preserving between them at any adjustment the relative angular shift *a* they present from one track to the other one. The supply terminals 1–2 and 21–22 for tracks 19 and 29 respectively are arranged in angular registration. In FIG. 2, the tracks 19 and 29 are connected in series relation with respect to the input supply. In FIG. 3, said tracks are connected in parallel relation with respect to said supply.

Figure 4:
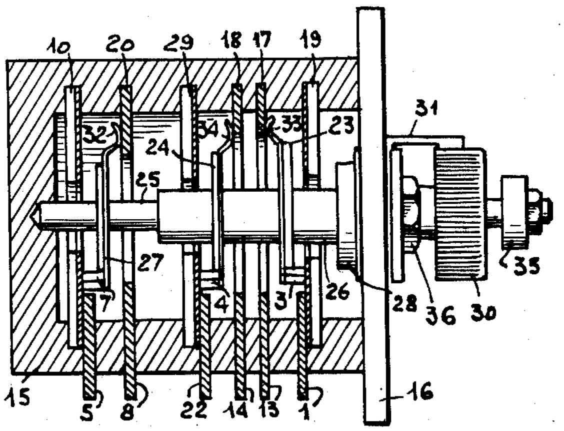
FIGURE 4 shows a partial cross-section view of a mechanical example of embodiment according to the electrical arrangement of FIG. 2, from which the mechanical mountings of such potentiometers as shown in FIGS. 1 and 3 become obvious.

A preferred mechanical embodiment corresponding to FIG. 2 is shown in FIG. 4 in a partially cross-sectioned view. The details of assembly of the members within the housing 15 are not shown. The housing is closed at its front by a mounting plate 16 and carries the complete potentiometer arrangement. The three tracks 10, 19 and 29 are shown as layers on disc-shaped supporting plates spaced apart within the housing. As noted previously, the tracks 19 and 29 could be, if desired, carried on the opposite faces of a single disc-shaped carrier member, of dielectric material. Three conductive rings 17, 18 and 20 are also carried by the housing concentric to the tracks and stubs pass through the wall of the housing for making the electrical connections for the supply of the tracks 19 and 29 and for the output from the potentiometer. In FIG. 4, terminals 1, 22 and 5 are shown as such. The rings 17, 18 and 20 are provided with extensions for establishing the electrical connections between the tracks. These extensions are shown at 13, 14 and 8 in FIG. 4, corresponding to the leads in FIG. 2. The brushes or sliders 3, 4 and 7, are carried by ring-shaped members 23, 24 and 27 which in turn carry reslient conducting blades 32, 33 and 34, electrically connected to said brushes. The member 27 is linked to a shaft 25 and the members 23 and 24 are linked to a sleeve 26, through which the shaft 25 passes, the shaft being rotatable with respect to said sleeve. The sleeve 26 may rotate within a carrier 28 affixed to the mounting plate 16 and, otuside the housing, carries a milled knob 30 adjustable by the user for a rough adjustment of the potentiometer. A resilient blade 31 affixed to plate 16 constitutes, together with said knob, a ratchet-motion system quite simple but efficient for holding the brushes 3 and 4 at each rough adjustment of the potentiometer. The shaft 25 carries at its outer end an adjustment knob 35 for the fine adjustment of the potentiometer. The centering is ensured on the one part by the supporting arrangement of the inner end of shaft 25 within the housing 15 and on the other part by the support of the sleeve 26 within the member 28 affixed to the plate 16, a nut 36 securing the plate 16 against the housing. Shaft 25 rotates with soft friction within the sleeve maintained by the ratchet-motion system 30–31.

The mechanical arrangement for linear motion potentiometers is plain from what is explained above for rotation motion ones. The tracks are merely developed in rectilinear shape and the angular shift *a* is converted into a linear shift between the brushes 3 and 4 along their track or tracks.

What we claim is:

A potentiometer unit for analog computers and the like comprising:

a housing;

first, second and third disc-shaped insulating supporting members rigidly supported in axially spaced relation in said housing;

first, second and third resistive film tracks of arcuate shape rigidly mounted on said insulating members respectively, said first and second tracks having their respective terminal end portions in registry;

first, second and third pairs of supply terminals passing through a wall of said housing and electrically connected to the ends of said first, second and third resistive film tracks, respectively;

first, second and third conductive members mounted within said housing and respectively facing and electrically insulated from said first, second and third resistive film tracks, each of said members being of annular shape and including a tab protruding through the side wall of said housing;

first, second and third wiper members, each comprising a first wiper portion contacting a respective resistance track and a second wiper portion electrically connected to the first and contacting the respective annular conductive member for carrying current from said resistive tracks to said conductive members and protruding tabs thereof, the wipers of said first and second members being relatively, slightly, angularly shifted and locked with respect to each other;

a sleeve carrying said first and second wiper members and extending axially through said first and second conductive members and said first and second resistive track supporting members, rotatably mounted in and having an end protruding from one end of said housing for angular rotational adjustment thereof;

a shaft rotatably mounted in said housing passing axially through said sleeve and through all three resistive track supporting members and conductor members and also having an end protruding outside said end of said housing, said third wiper member being secured to said shaft for adjustment of the angular position of said third wiper member with respect to said first and second wiper members, said first and second resistive film tracks being of a high resistance value and said third resistive film track being of a resistance value which is relatively lower than said first and second film tracks;

and means for rotating said shaft and said sleeve.

References Cited by the Examiner

UNITED STATES PATENTS

| | | | |
|---|---|---|---|
| 1,704,153 | 3/1929 | Stoekle | 338—123 |
| 2,401,037 | 5/1946 | Arvin | 338—134 |
| 2,836,690 | 5/1958 | Barr | 338—124 |
| 2,850,604 | 9/1958 | Rowley | 338—121 |
| 2,881,295 | 4/1959 | Brown | 338—123 |

FOREIGN PATENTS

| | | |
|---|---|---|
| 278,930 | 10/1927 | Great Britain. |
| 635,118 | 4/1950 | Great Britain. |
| 721,952 | 1/1955 | Great Britain. |

RICHARD M. WOOD, *Primary Examiner.*